(12) United States Patent
Chang et al.

(10) Patent No.: US 8,008,360 B2
(45) Date of Patent: Aug. 30, 2011

(54) PROTON EXCHANGE MEMBRANE AND METHOD FOR MANUFACTURING THE SAME

(75) Inventors: Chung-Liang Chang, Hsinchu (TW); Jing-Pin Pan, Hsinchu Hsien (TW); Tsung-Hsiung Wang, Dali (TW); Yueh-Wei Lin, Hsinchu (TW); Ya-Tin Hsu, Taipei (TW)

(73) Assignee: Industrial Technology Research Institute (TW)

( * ) Notice: Subject to any disclaimer, the term of this patent is extended or adjusted under 35 U.S.C. 154(b) by 336 days.

(21) Appl. No.: 12/418,534

(22) Filed: Apr. 3, 2009

(65) Prior Publication Data
US 2010/0130625 A1 May 27, 2010

(30) Foreign Application Priority Data
Nov. 27, 2008 (TW) ................................ 97145902 A

(51) Int. Cl.
*B01J 49/00* (2006.01)
(52) U.S. Cl. ......... 521/27; 252/62.2; 427/115; 525/276; 525/282; 525/291; 525/404; 525/451; 525/422; 528/322; 528/367; 548/521
(58) Field of Classification Search .................. 252/62.2; 427/115; 521/27; 525/276, 282, 291, 404, 525/451, 422; 528/322, 367; 548/521
See application file for complete search history.

(56) References Cited

U.S. PATENT DOCUMENTS

| 4,983,690 A | 1/1991 | Cameron et al. | |
|---|---|---|---|
| 2008/0075999 A1 * | 3/2008 | Izuhara et al. | 429/33 |
| 2008/0157021 A1 * | 7/2008 | Wang et al. | 252/62.2 |
| 2008/0221325 A1 * | 9/2008 | Pan et al. | 544/299 |

FOREIGN PATENT DOCUMENTS

CN 101219349 7/2008

OTHER PUBLICATIONS

Pan, J.P.; Shiau, G.Y.; Lin, S.S.; Chen, K.M.; Journal of Applied Polymer Science, 1992, vol. 45, p. 103-109.*
Chinese Office Action from corresponding Chinese Application No. 200810185731.2, Jan. 25, 2011.

* cited by examiner

*Primary Examiner* — David Wu
*Assistant Examiner* — Robert Jones
(74) *Attorney, Agent, or Firm* — Lowe Hauptman Ham & Berner, LLP

(57) ABSTRACT

A proton exchange membrane and method for formation the same is disclosed. When forming the proton exchange membrane, first, a bismaleimide and barbituric acid are copolymerized to form a hyper-branched polymer. Next, the solvent of the sulfonated tetrafluorethylene copolymer (Nafion) aqueous solution is replaced with dimethyl acetamide (DMAc). 10 to 15 parts by weight of the hyper-branched polymer is added to 90 to 85 parts by weight of the Nafion in the DMAc solution, stood and heated to 50° C. for interpenetration of the hyper-branched polymer and the Nafion. The heated solution is coated on a substrate, baked, and pre-treated to remove residue solvent to complete formation of the proton exchange membrane.

15 Claims, 2 Drawing Sheets

PROTON EXCHANGE MEMBRANE AND METHOD FOR MANUFACTURING THE SAME

CROSS REFERENCE TO RELATED APPLICATIONS

This Application claims priority of Taiwan Patent Application No. 97145902, filed on Nov. 27, 2008, the entirety of which is incorporated by reference herein.

BACKGROUND OF THE INVENTION

1. Field of the Invention

The present invention relates to proton exchange membranes, and in particular relates to composition and formation methods to improve dimensional stability of the membrane.

2. Description of the Related Art

Nafion® (sulfonated tetrafluorethylene copolymer) is a conductive polymer developed by Dupont in the 1960's. This compound is also called ionomer due to its ionic property that comes from the sulfonatic acid grafted on the terminal of the polytetrafluorethylene bone chain. Nafion has excellent thermal stability and mechanical properties, thereby being of interest for researchers, researching proton exchange membrane fuel cells (PEMFC).

The proton of the sulfonatic acid in Nafion can transfer from one solfonic acid to another for proton exchange. On the contrary, the electron and cation of the sulfonatic acid in Nafion cannot transfer from one solfonic acid to another for proton exchange.

Although Nafion has many advantages, its size changes substantially after being heated. U.S. Pat. No. 4,983,690 discloses a Nafion and bismaleimide blend to improve the mechanical properties of films made thereby, however, its dimension still changes after heated.

Accordingly, a novel method for improving physical properties of a Nafion film is called for.

BRIEF SUMMARY OF THE INVENTION

The invention provides a proton exchange membrane, comprising 85 to 90 parts by weight of a sulfonated tetrafluorethylene copolymer, and 15 to 10 parts by weight of a hyper-branched polymer polymerized by bismaleimide and barbituric acid, wherein the sulfonated tetraflorethylene copolymer and the hyper-branched polymer inter-penetrate each other.

The invention also provides a method for forming a proton exchange membrane, comprising copolymerizing a bismaleimide and a barbituric acid to form a hyper-branched polymer, replacing a water and alcohol of a sulfonated tetrafluorethylene copolymer aqueous solution with dimethyl acetamide (DMAc), adding 10 to 15 parts by weight of the hyper-branched polymer to 90 to 85 parts by weight of the sulfonated tetrafluoroethylene copolymer in the DMAc solution to form a mixture, standing and heating the mixture to 50° C. for inter-penetration of the hyper-branched polymer and the sulfonated tetrafluoroethylene copolymer, thereby forming an inter-penetrated polymer solution, coating the inter-penetrated polymer solution on a substrate, and baking and pre-treating the coating to remove residue DMAc to complete formation of the proton exchange membrane.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
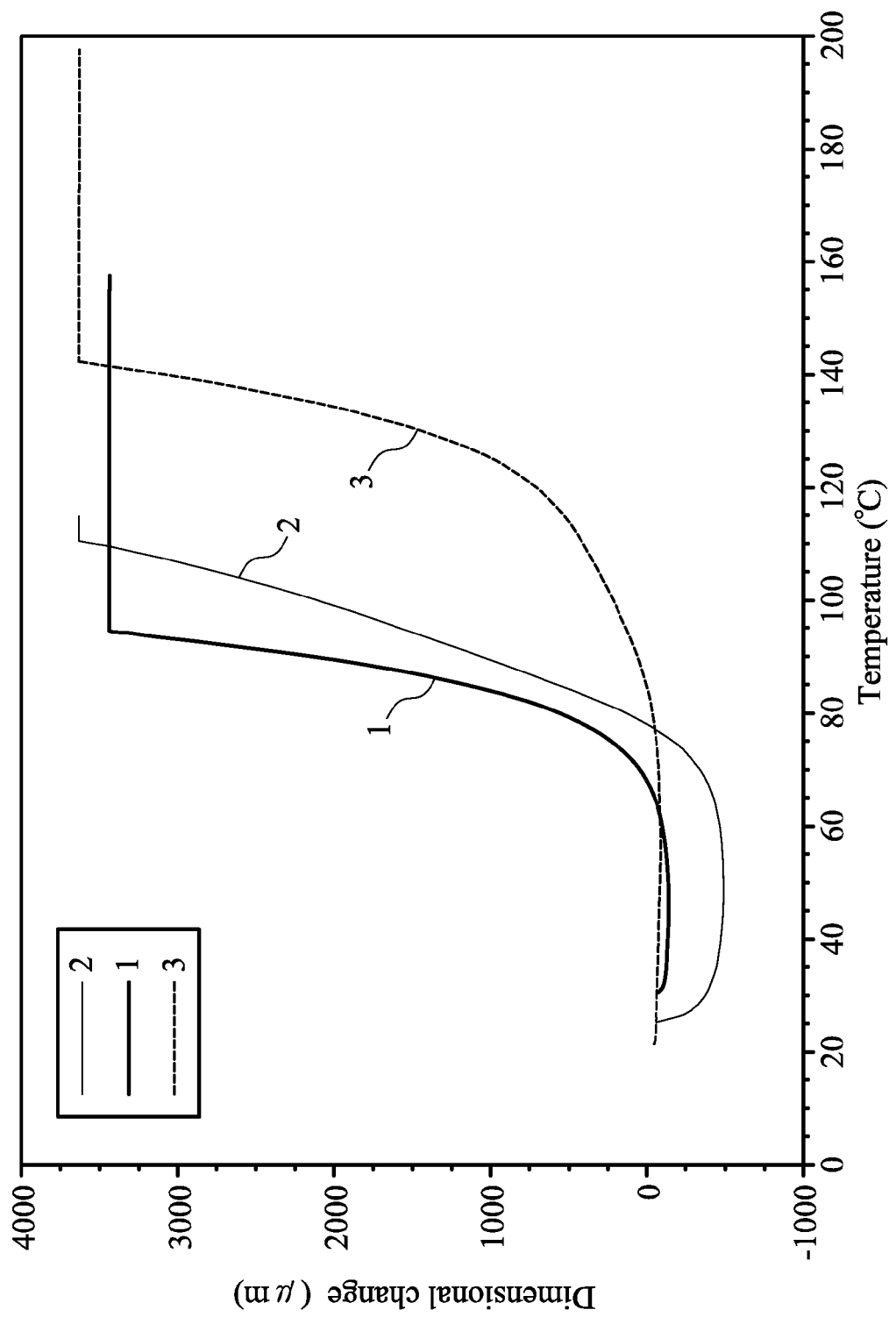
FIG. 1 is a diagram showing the dimensional change versus temperature curves of the proton exchange membranes in Examples and Comparative Examples of the invention.

The following description is of the best-contemplated mode of carrying out the invention. This description is made for the purpose of illustrating the general principles of the invention and should not be taken in a limiting sense. The scope of the invention is best determined by reference to the appended claims.

The invention provides a method for forming a proton exchange membrane. Firstly, bismaleimide and barbituric acid are copolymerized to form a hyper-branched polymer. The bismaleimide has a formula as shown in Formula 1:

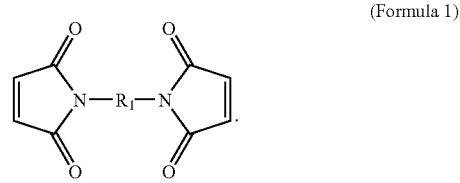

(Formula 1)

In formula 1, $R_1$ includes —$(CH_2)_2$—, —$(CH_2)_6$—, —$(CH_2)_8$—, —$(CH_2)_{12}$—,

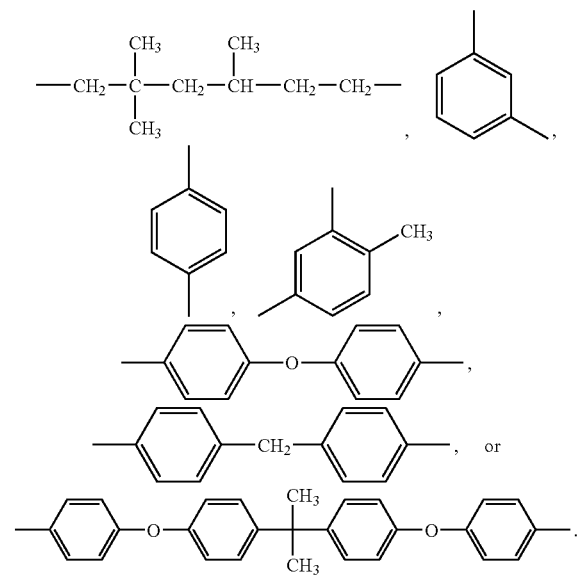

The barbituric acid has a formula as shown in Formula 2:

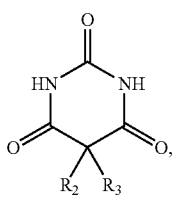

(Formula 2)

wherein each of $R_2$ and $R_3$ is independently selected from hydrogen, methyl, phenyl, isopropyl, isobutyl, or isopentyl.

In one embodiment, the bismaleimide and the barbituric acid have a molar ratio of about 10:1 to 1:1. The bismaleimide and the barbituric acid of an appropriate ratio are added into the γ-butyrolactone, heated to 130° C., and reacted at 130° C. for 4 hours to obtain a hyper-branched polymer.

In one embodiment, the monomers of the hyper-branched polymer are not only the described bismaleimide and the barbituric acid but also mono-maleimide and/or multi-maleimide. The mono-maleimide can be N-phenylmaleimide, N-cyclohexylmaleimide, and the likes. The multi-maleimide can be tri-(4-phenylmalemido) amine, poly(tolylmaleimide), and the likes. In one embodiment, the bismaleimide and "the multi-maleimide and/or the mono-maleimide" have a molar ratio of about 99:1 to 1:1.

Subsequently, the solvent of the commercially available sulfonated tetrafluorethylene copolymer (Nafion) is replaced with dimethyl acetamid (DMAc). The replacement is processed by adding a high boiling point solvent such as DMAc to the Nafion aqueous solution and then heating the Nafion DMAc solution to vaporize the water thereof. In one embodiment, the Nafion is a NAF DE2020CS commercially available Nafion from Dupont.

A hyper-branched polymer is added to the Nafion DMAc solution, stood and heated to 50° C., such that the hyper-branched polymer and the Nafion are inter-penetrated with each other to form a so-called inter-penetrated polymer. The hyper-branched polymer and the Nafion have a weight ratio of 10:90 to 15:85. The inter-penetrating degree of the hyper-branched polymer and the Nafion is determined by transparency, wherein higher transparency means a higher inter-penetrating degree and lower transparency or even opaque means a lower inter-penetrating degree. Note that the step of heating and standing the mixture is completely standing, and the general mixing methods such as stirring or supersonic vibration are unfavorable for forming the inter-penetrated polymer. If the inter-penetrating degree is too low, the proton exchange membrane will have poor dimensional stability.

Finally, the inter-penetrated polymer solution is coated on a substrate, baked to 130° C., and pre-treated. The pre-treatment is dipped in $H_2O$, 3% $H_2O_2$, $H_2O$, 0.5 M $H_2SO_4$, and $H_2O$, respectively, wherein each treatment step is processed at 80° C. for 1 hour. Following, residue DMAc is removed by the previously described pre-treatment to form a proton exchange membrane. A proton exchange membrane after pre-treatment has lower stability than a proton exchange membrane without pre-treatment. However, the proton exchange membrane after pre-treatment has higher conductivity. It is understood that the proton exchange membrane can be applied to a so-called proton exchange membrane fuel cell.

EXAMPLES

Comparative Example 1-1

30 g of a Nafion aqueous solution (DE2020CS, commercially available from Dupont) was added 18 g of DMAc, and then heated to 60° C. by a water bath to replace the water and alcohol of the Nafion solution with DMAc.

The described Nafion DMAc solution was directly coated on a substrate, dried and pre-treated to remove residue solvent for forming a 10 cm*10 cm*0.003 cm proton exchange membrane. The curve of membrane size change versus temperature is shown as curve 1 in FIGS. 1 and 2. The described proton exchange membrane had a conductivity of about $9*10^{-2}$ S/cm.

Comparative Example 1-2

Figure 2:
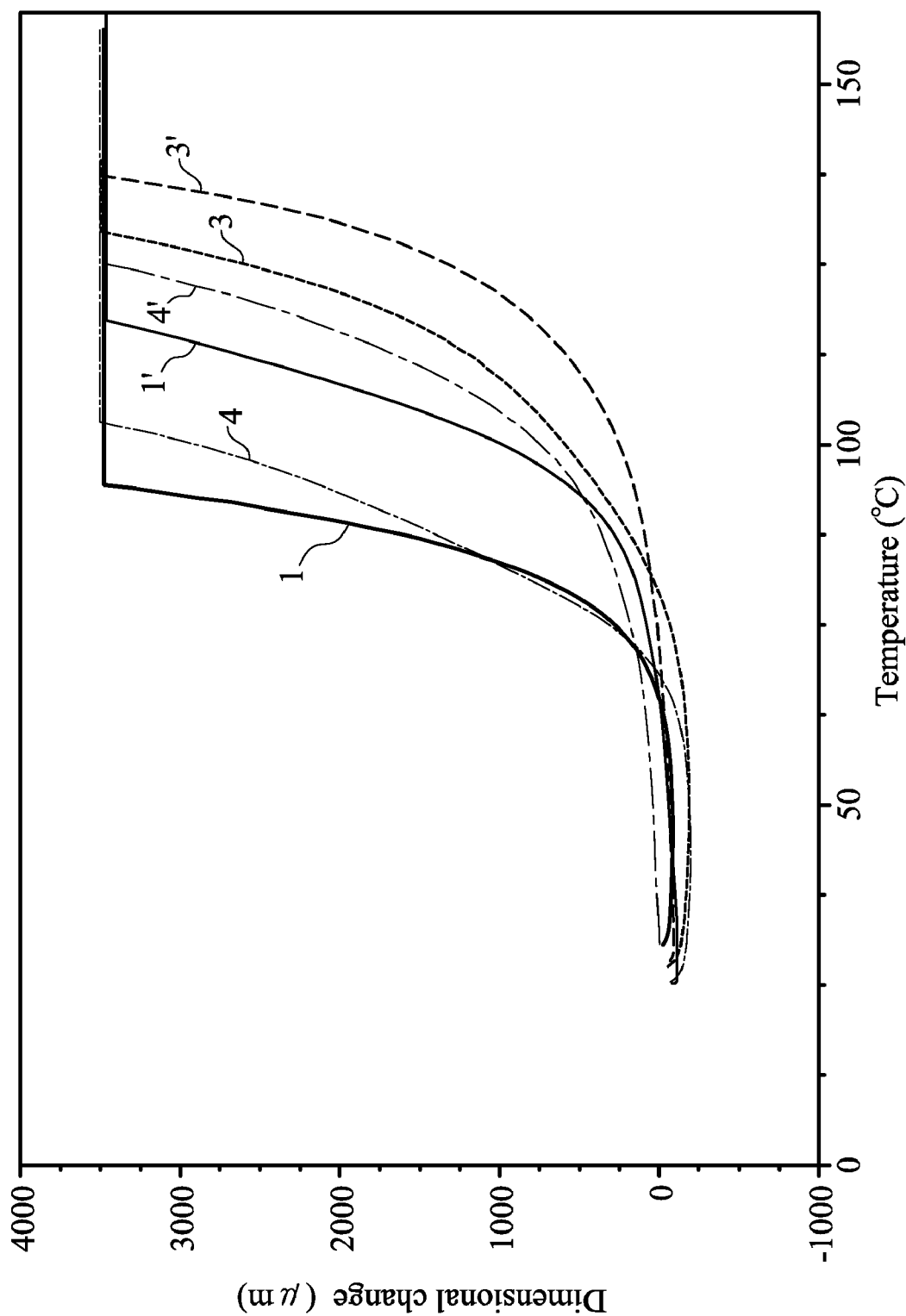
FIG. 2 is a diagram showing the dimensional change versus temperature curves of the proton exchange membranes before and after the pre-treatment processes in Examples and Comparative Examples of the invention.

Similar to Comparative Example 1-1, the difference in Comparative Example 1-2 is elimination of the pre-treatment process to remove residue solvent. The curve of membrane size change versus temperature is shown as curve 1' in FIG. 2. As shown in FIG. 2, the pre-treatment process largely reduces the dimensional stability of the proton exchange membrane while increasing temperature.

Comparative Example 2

30 g of a Nafion aqueous solution (DE2020CS, commercially available from Dupont) was added 18 g of DMAc, and then heated to 60° C. by a water bath to replace the water and alcohol in the Nafion solution with DMAc.

Subsequently, 0.2439 g of bismaleimide (BMI) was dissolved in 0.9756 g of γ-butyrolactone, and heated until completely dissolved. The BMI solution was added to 8.7805 g of a Nafion DMAc solution and stood. The mixture was directly coated on a substrate and dried to form a 10 cm*10 cm*0.003 cm proton exchange membrane. The curve of membrane size change versus temperature is shown as curve 2 in FIG. 1.

Example 1-1

16.967 g of bismaleimide (BMI of Formula 3) and 3.3033 g of barbituric acid were added to 100 g of γ-butyrolactone, heated to 130° C., and reacted at 130° C. for 4.5 hours to obtain a hyper-branched polymer.

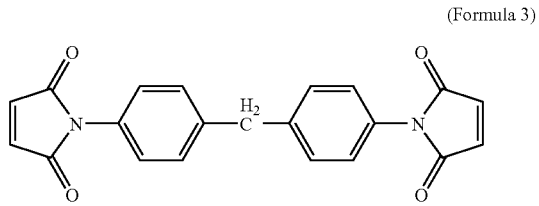

(Formula 3)

30 g of a Nafion aqueous solution (DE2020CS, commercially available from Dupont) was added 18 g of DMAc, and then heated to 60° C. by a water bath to replace the water and alcohol in the Nafion solution with DMAc.

The described hyper-branched polymer solution was added to the Nafion DMAc solution, stood and heated to 50° C. until the opaque mixture transformed to become a transparent solution, thereby completing formation of an inter-penetrated polymer solution.

The inter-penetrated polymer solution was coated on a substrate, baked to 130° C. to remove most of the solvent. The dried film was sequentially pre-treated by H₂O, 3% H₂O₂, H₂O, 0.5 M H₂SO₄, and H₂O, respectively, wherein each treatment step was processed at 80° C. for 1 hour. The residue solvent was removed by the previously described pre-treatment to form a 10 cm*10 cm*0.003 cm proton exchange membrane. The curve of membrane size change versus temperature is shown as curve 3 in FIGS. 1 and 2. The described proton exchange membrane had a conductivity of about $8*10^{-2}$ S/cm similar to that of a pure Nafion membrane.

As shown in FIG. 1, the proton exchange membrane of Example 1-1 has better dimensional stability than Comparative Example 2. Compared to bismaleimide, it was shown that the hyper-branched polymer polymerized of the bismaleimide and barbituric acid may further improve the mechanical property of the Nafion membrane.

Example 1-2

Similar to Example 1-1, the difference in Example 1-2 was the elimination of the pre-treatment process to remove residue solvent. The curve of membrane size change versus temperature is shown as curve 3' in FIG. 2. The described proton exchange membrane had a conductivity of about $5*10^{-4}$ S/cm. As shown when comparing curves 3 and 3', the pre-treatment reduces dimensional stability of the proton exchange membrane while increasing temperature. However, the dimensional stability reduction from curve 3' to curve 3 is dramatically less than the influence of the pre-treatment process in a pure Nafion membrane (from curve 1' to curve 1). Although the pre-treatment process reduces membrane dimensional stability, it efficiently improves the conductivity of the proton exchange membrane.

Example 1-3

Similar to Example 1-1, the difference in Example 1-3 is that the opaque mixture of the hyper-branched polymer and the Nafion DMAc solution (the non-inter-penetrated polymer) was directly coated on the substrate. As shown in FIG. 2, curve 4 is the size change versus temperature of the membrane after pre-treatment, and curve 4' is the size change versus temperature of the membrane without pre-treatment. Compared to the inter-penetrated polymers resulting from standing the mixture and heating in Examples 1-1 and 1-2, the proton exchange membranes formed by the opaque polymer mixture had poor dimensional stability.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A proton exchange membrane, comprising:
   85 to 90 parts by weight of a sulfonated tetraflorethylene copolymer; and
   15 to 10 parts by weight of a hyper-branched polymer polymerized by bismaleimide and barbituric acid,
   wherein the sulfonated tetraflorethylene copolymer and the hyper-branched polymer inter-penetrate each other.

2. The proton exchange membrane as claimed in claim 1, wherein the bismaleimide is represented by the formula as below:

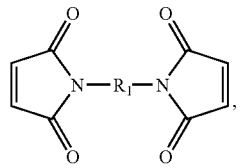

wherein $R_1$ is $-(CH_2)_2-$, $-(CH_2)_6-$, $-(CH_2)_8-$, $-(CH_2)_{12}-$,

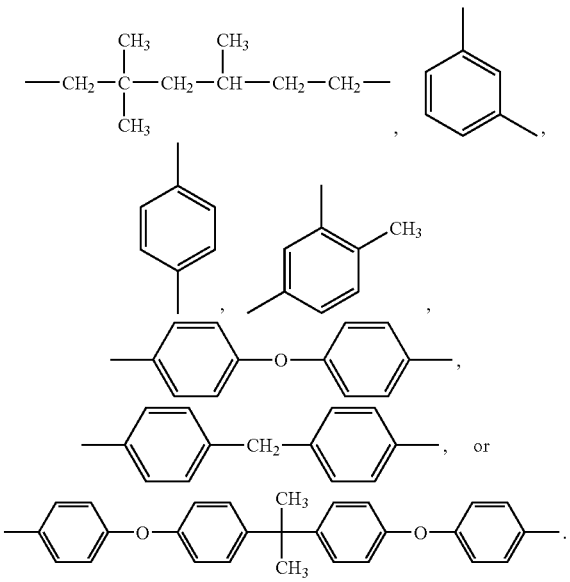

3. The proton exchange membrane as claimed in claim 1, wherein the bismaleimide and the barbituric acid have a molar ratio of 10:1 to 1:1.

4. The proton exchange membrane as claimed in claim 1, wherein the hyper-branched polymer is further polymerized by other monomers, and the other monomers comprise mono-maleimide and/or multi-maleimide.

5. The proton exchange membrane as claimed in claim 4, wherein the mono-maleimide comprises N-phenylmaleimide or N-cyclohexylmaleimide.

6. The proton exchange membrane as claimed in claim 4, wherein the multi-maleimide comprises tri-(4-phenylmaleimido) amine or poly(tolylmaleimide).

7. The proton exchange membrane as claimed in claim 4, wherein the bismaleimide and the "multi-maleimide and/or the mono-maleimide" have a molar ratio of 99:1 to 1:1.

8. A proton exchange membrane fuel cell, comprising the proton exchange membrane as claimed in claim 1.

9. A method for forming a proton exchange membrane, comprising:
   copolymerizing a bismaleimide and a barbituric acid to form a hyper-branched polymer;
   replacing water and alcohol of a sulfonated tetrafluorethylene copolymer aqueous solution with dimethyl acetamide (DMAc);
   adding 10 to 15 parts by weight of the hyper-branched polymer to 90 to 85 parts by weight of the sulfonated tetrafluoroethylene copolymer in the DMAc solution to form a mixture;
   standing and heating the mixture to 50° C. for inter-penetration of the hyper-branched polymer and the sulfonated tetrafluorethylene copolymer, thereby forming an inter-penetrated polymer solution;

coating the inter-penetrated polymer solution on a substrate; and baking and pre-treating the coating to remove residue DMAc to complete formation of the proton exchange membrane.

10. The method as claimed in claim 9, wherein the bismaleimide is represented by the formula as below:

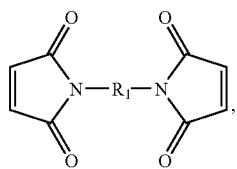

wherein $R_1$ is —$(CH_2)_2$—, —$(CH_2)_6$—, —$(CH_2)_8$—, —$(CH_2)_{12}$—,

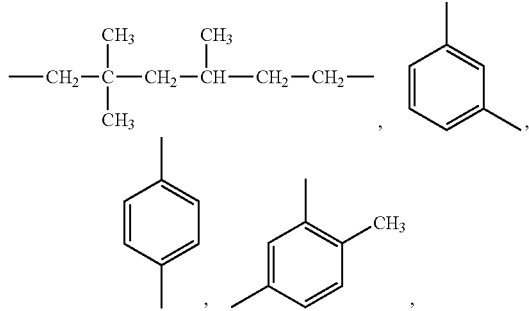

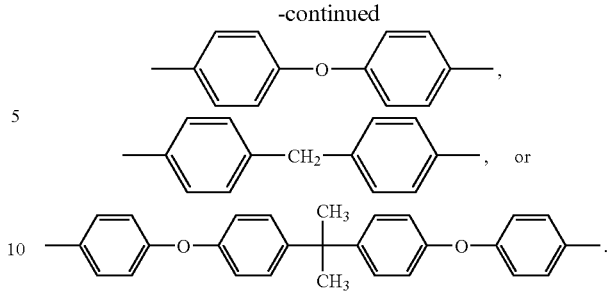

11. The method as claimed in claim 9, wherein the bismaleimide and the barbituric acid have a molar ratio of 10:1 to 1:1.

12. The method as claimed in claim 9, wherein the step of copolymerizing the bismaleimide and barbituric acid to form a hyper-branched polymer further comprising other monomers, and the other monomers comprise mono-maleimide and/or multi-maleimide.

13. The method as claimed in claim 12, wherein the mono-maleimide comprises N-phenylmaleimide or N-cyclohexyl-maleimide.

14. The method as claimed in claim 12, wherein the multi-maleimide comprises tri-(4-phenylmalemido) amine or poly(tolylmaleimide).

15. The method as claimed in claim 12, wherein the bismaleimide and the "multi-maleimide and/or the mono-maleimide" have a molar ratio of 99:1 to 1:1.

* * * * *